(12) United States Patent
Xu et al.

(10) Patent No.: US 12,143,950 B2
(45) Date of Patent: Nov. 12, 2024

(54) TIMING ALIGNMENT HANDLING FOR CONFIGURED GRANT BASED SMALL DATA TRANSMISSIONS IN INACTIVE MODE

(71) Applicant: Apple Inc., Cupertino, CA (US)

(72) Inventors: Fangli Xu, Beijing (CN); Ralf Rossbach, Munich (DE); Dawei Zhang, Saratoga, CA (US); Haijing Hu, Los Gatos, CA (US); Sarma V. Vangala, Campbell, CA (US); Murtaza A. Shikari, Mountain View, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 17/438,443

(22) PCT Filed: Jan. 12, 2021

(86) PCT No.: PCT/CN2021/071227
§ 371 (c)(1),
(2) Date: Sep. 12, 2021

(87) PCT Pub. No.: WO2022/150955
PCT Pub. Date: Jul. 21, 2022

(65) Prior Publication Data
US 2022/0256484 A1 Aug. 11, 2022

(51) Int. Cl.
*H04W 76/30* (2018.01)
*H04W 56/00* (2009.01)
*H04W 76/10* (2018.01)

(52) U.S. Cl.
CPC ......... *H04W 56/001* (2013.01); *H04W 76/10* (2018.02); *H04W 76/30* (2018.02)

(58) Field of Classification Search
CPC ... H04W 56/001; H04W 76/30; H04W 76/27; H04W 76/10; H04W 4/029
See application file for complete search history.

(56) References Cited

U.S. PATENT DOCUMENTS

| 2019/0289660 A1 | 9/2019 | Yi et al. |
| 2020/0107268 A1 | 4/2020 | Lee et al. |

(Continued)

OTHER PUBLICATIONS

ITL, "TAT Maintenance for CG Based SDT"; 3GPP TSG-RAN WG2, Meeting #112 electronic; R2-2009649; Nov. 2020; 2 pgs.
(Continued)

*Primary Examiner* — Anez C Ebrahim
(74) *Attorney, Agent, or Firm* — Kowert, Hood, Munyon, Rankin & Goetzel, P.C.

(57) ABSTRACT

This disclosure relates to techniques for handling timing alignment for configured grant based small data transmissions in inactive mode in a wireless communication system. A wireless device may establish a radio resource control connection with a cellular base station. The wireless device may receive an indication to release the radio resource control connection. The indication to release the radio resource control connection may configure resources for performing uplink transmissions while in the radio resource control inactive mode. A timing advance may be maintained while in the radio resource control inactive mode. An uplink transmission may be performed using resources configured for performing uplink transmissions while in the radio resource control inactive mode. The uplink transmission may be performed using the timing advance.

9 Claims, 11 Drawing Sheets

(56) References Cited

U.S. PATENT DOCUMENTS

2020/0107295 A1    4/2020  Lee et al.
2022/0256423 A1*   8/2022  Latheef ................ H04W 24/08
2023/0050943 A1*   2/2023  Luo ..................... H04W 72/20

OTHER PUBLICATIONS

LG Electronics Inc., "UL Data Transmission in Rrc_Inactive"; 3GPP TSG-RAN WG2, Meeting #96; R2-168280; Nov. 2016; Reno, USA; 3 pgs.
Sony, "Details of CG-Based Schemes for SDT in NR"; 3GPP TSG-RAN WG2, Meeting #112 electronic; R2-2009890; Nov. 2020; 3 pgs.
International Search Report and Written Opinion for International Application No. PCT/CN2021/071227; mailed Oct. 12, 2021; 7 pgs.

\* cited by examiner

TIMING ALIGNMENT HANDLING FOR CONFIGURED GRANT BASED SMALL DATA TRANSMISSIONS IN INACTIVE MODE

PRIORITY CLAIM INFORMATION

This application is a U.S. National Stage application of International Application No. PCT/CN2021/071227, filed Jan. 12, 2021, titled "Timing Alignment Handling for Configured Grant Based Small Data Transmissions in Inactive Mode", which is hereby incorporated by reference in its entirety.

FIELD

The present application relates to wireless communications, including systems, apparatuses, and methods for handling timing alignment for configured grant based small data transmissions in inactive mode in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Aspects are presented herein of apparatuses, systems, and methods for handling timing alignment for configured grant based small data transmissions in inactive mode in a wireless communication system.

According to the techniques described herein, a wireless device may establish a radio resource control connection with a cellular base station, then subsequently receive an indication to release the radio resource control connection and operate in an inactive mode with respect to radio resource control. The indication to release the radio resource control connection may configure resources for performing uplink data transmissions while inactive, for example according to a configured grant small data transfer procedure configuration.

The wireless device may maintain a timing advance while inactive. This may include running a timing alignment timer, which may continue from being initiated prior to release of the radio resource control connection, or may be restarted upon release of the radio resource control connection. The timing advance may be considered valid while the timing alignment timer is unexpired, and may be considered invalid once the timing alignment timer reaches expiry. Alternatively, the timing advance may be maintained as indefinitely valid, based on the cell size of the wireless device being sufficiently small, the wireless device being stationary, the wireless device being configured to autonomously update the timing advance, and/or any of various other possible conditions.

If uplink data is received at the wireless device while inactive and with a valid configured grant small data transfer configuration and timing advance, the wireless device may perform a configured grant small data transfer procedure using the timing advance maintained by the wireless device while inactive, at least according to some aspects.

If uplink data is received at the wireless device while inactive and without a valid timing advance, the wireless device may perform an alternative small data transfer procedure while inactive, such as a random access small data transfer procedure, or may resume a radio resource control connection to transmit the uplink data, according to various aspects.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various aspects is considered in conjunction with the following drawings, in which.

Figure 1:
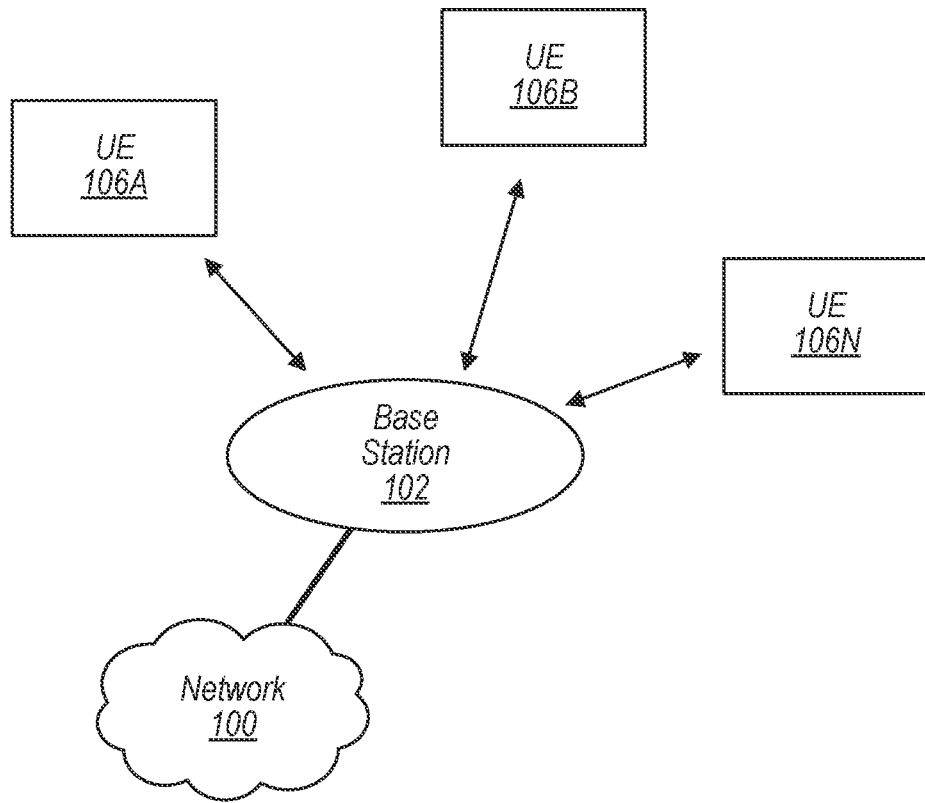
FIG. 1 illustrates an exemplary (and simplified) wireless communication system, according to some aspects.

While features described herein are susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RAN: Radio Access Network
CN: Core Network
TX: Transmission/Transmit
RX: Reception/Receive
RAT: Radio Access Technology
TRP: Transmission-Reception-Point
RRC: Radio Resource Control
NAS: Non Access Stratum
AS: Access Stratum
CG: Configured Grant
SDT: Small Data Transfer
TA: Timing Advance
TAT: Time Alignment Timer Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones, tablet computers, portable gaming devices, wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
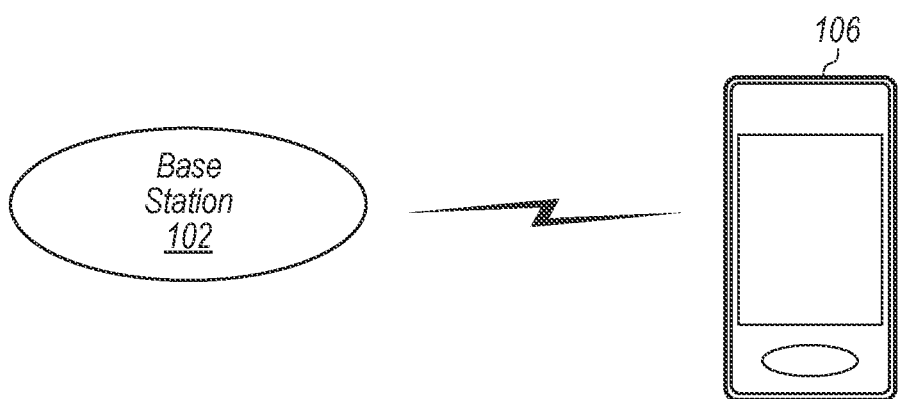
FIG. 2 illustrates an exemplary base station in communication with an exemplary wireless user equipment (UE) device, according to some aspects.

FIGS. 1 and 2—Exemplary Communication System

FIG. 1 illustrates an exemplary (and simplified) wireless communication system in which aspects of this disclosure may be implemented, according to some aspects. It is noted that the system of FIG. 1 is merely one example of a possible system, and aspects may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some aspects, the UE 106 may be configured to handle timing alignment for configured grant based small data transmissions in inactive mode, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some aspects. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some aspects, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some aspects, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
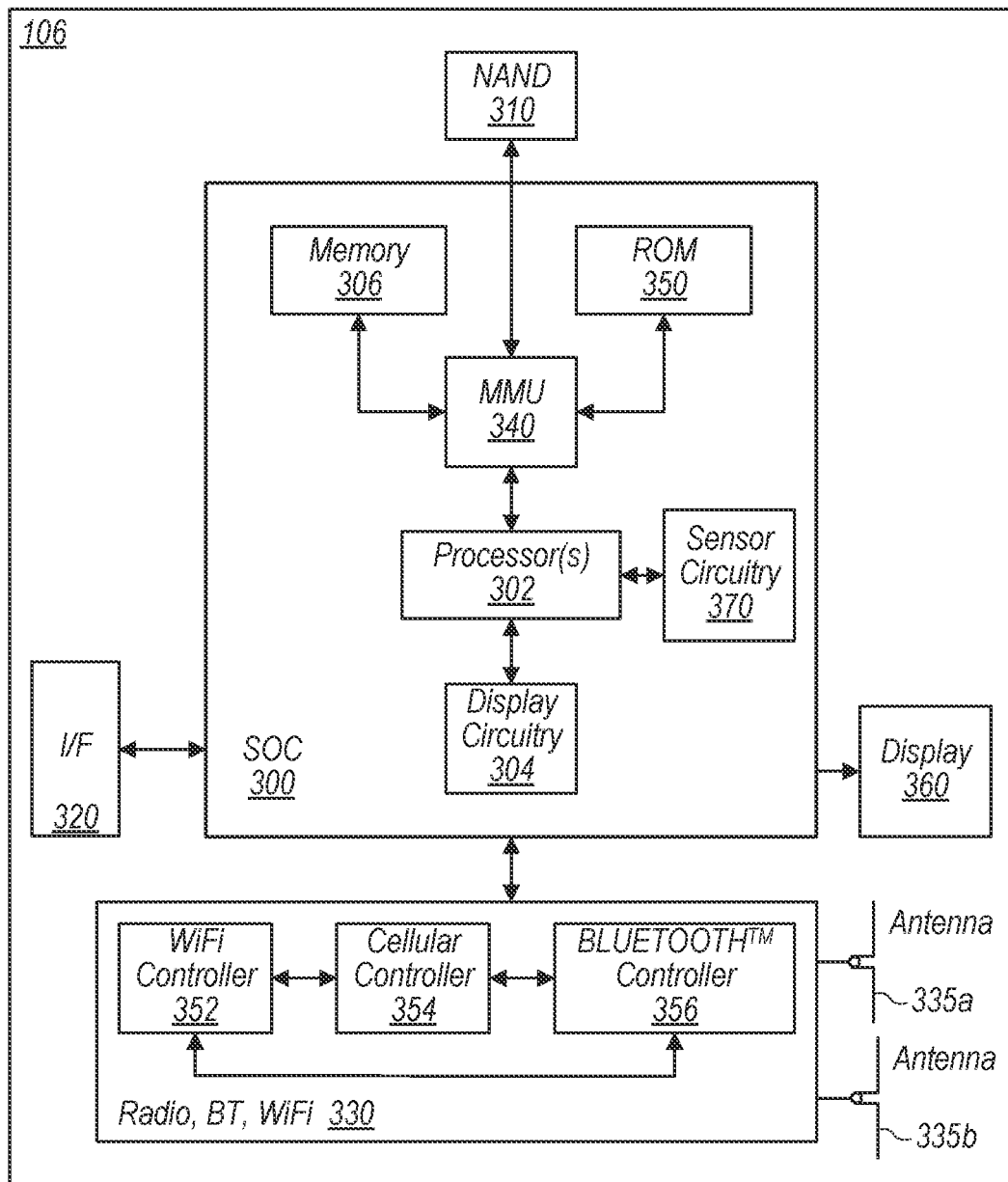
FIG. 3 illustrates an exemplary block diagram of a UE, according to some aspects.

FIG. 3—Block Diagram of an Exemplary UE Device

FIG. 3 illustrates a block diagram of an exemplary UE 106, according to some aspects. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some aspects, the MMU 340 may be included as a portion of the processor(s) 302.

As shown, the SOC 300 may be coupled to various other circuits of the UE 106. For example, the UE 106 may include various types of memory (e.g., including NAND flash memory_310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some aspects.

The UE 106 may include hardware and software components for implementing methods for handling timing alignment for configured grant based small data transmissions in inactive mode, such as described further subsequently herein. The processor(s) 302 of the UE device 106 may be configured to implement part or all of the methods described herein, e.g., by executing program instructions stored on a memory medium (e.g., a non-transitory computer-readable memory medium). In other aspects, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to handle timing alignment for configured grant based small data transmissions in inactive mode according to various aspects disclosed herein. Processor(s) 302 may also implement various other applications and/or end-user applications running on UE 106.

In some aspects, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some aspects, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other aspects have fewer or more similar controllers for various different RATs that may be implemented in UE device 106.

Further, aspects in which controllers may implement functionality associated with multiple radio access technologies are also envisioned. For example, according to some aspects, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
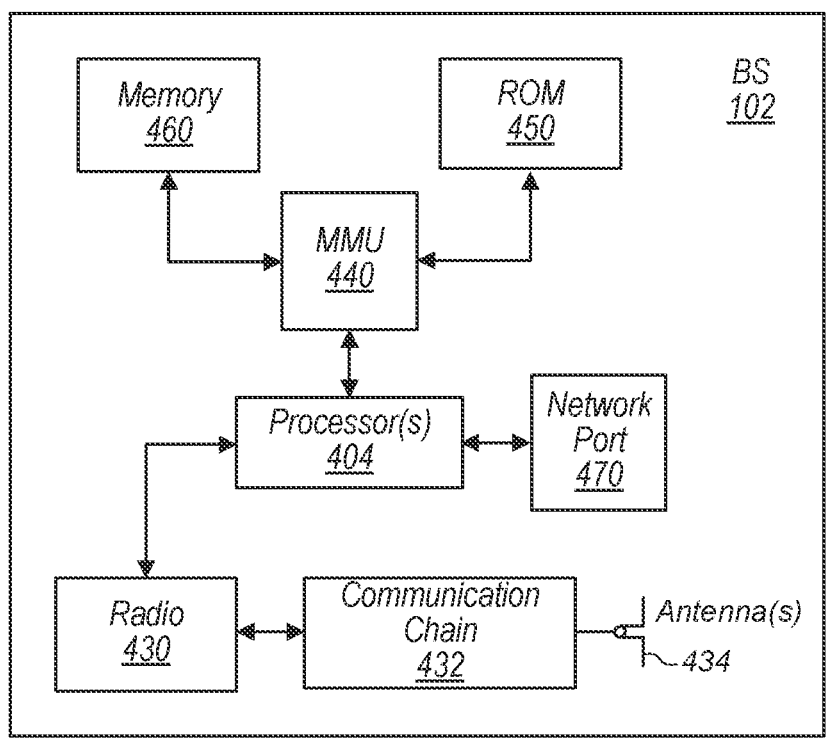
FIG. 4 illustrates an exemplary block diagram of a base station, according to some aspects.

FIG. 4—Block Diagram of an Exemplary Base Station

FIG. 4 illustrates a block diagram of an exemplary base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
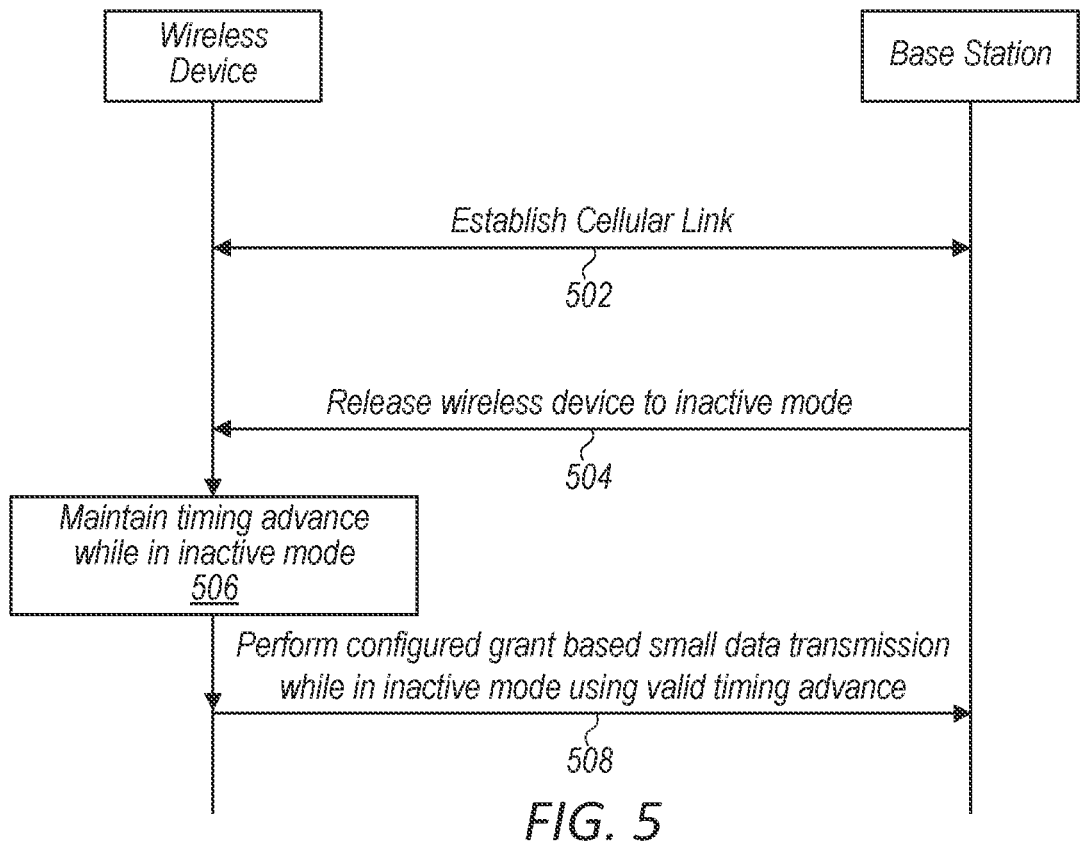
FIG. 5 is a signal flow diagram illustrating aspects of an exemplary possible method for handling timing alignment for configured grant based small data transmissions in inactive mode in a wireless communication system, according to some aspects.

FIG. 5—Handling Timing Alignment for Configured Grant Based Small Data Transmissions in Inactive Mode Wireless communication is being used for an increasingly broad set of use cases. These use cases can range from scenarios in which very small and/or infrequent data transfers are typically performed to scenarios in which high volume and/or frequent data transfers are typically performed, from scenarios in which very low latency is required to scenarios in which there is little or no latency sensitivity, and can include many more wide ranging scenarios.

For most wireless devices, operating efficiently to perform communication in accordance with their intended use(s) may be a highly important consideration. Accordingly, new techniques and improvements to existing techniques to reduce power consumption while maintaining or increasing the effectiveness of wireless communication may be highly beneficial additions to wireless communication technologies, at least according to some aspects.

One existing mechanism in cellular communication for reducing power consumption may include selectively operating in an idle or inactive mode (such as a 3GPP RRC Inactive state or a 3GPP RRC Idle state), e.g., as opposed to a connected mode (such as a 3GPP RRC connected state). Such operating modes may support reduced power consumption for periods of time when little or no active data communication is being performed.

As the range of wireless communication use cases expands, one possible area of improvement could include providing support for performing small data transfers while a wireless device operates in RRC inactive mode. Such support may allow for a wireless device to communicate some amount of data while continuing to benefit from the reduced power consumption of the RRC inactive mode (e.g., compared to the RRC connected mode), and/or may reduce the latency (e.g., by reducing the delay from receiving uplink data at baseband and transmitting the uplink data) of uplink communications when the wireless device is in the RRC inactive mode.

There may be multiple possible approaches to supporting such uplink data transfers by a wireless device that is in RRC inactive mode. One possible approach may include using resources configured for uplink transmissions in RRC inactive, such as may be possible by providing a configured grant configuration in a 3GPP based cellular communication system. Such an approach may be relatively efficient with respect to network resource use and signaling requirements, but may rely on the wireless device being able to perform such an uplink transmission using a timing advance value that will result in the transmission being received by the network sufficiently synchronously with other uplink transmissions that the network is able to successfully decode the uplink transmission (and any other synchronous uplink transmissions), at least according to some aspects.

Accordingly, it may be useful to provide techniques for handling timing alignment for configured grant based small data transmissions in inactive mode, for example to reduce the transmission latency and/or reduce power consumption for a wireless device to perform small data transmissions. FIG. 5 is a flowchart diagram illustrating such a method for handling timing alignment for configured grant based small data transmissions in inactive mode, at least according to some aspects.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various aspects, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some aspects, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various aspects.

Establishing the wireless link may include establishing a RRC connection with a serving cellular base station, at least according to some aspects. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In some aspects, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

While the RRC connection is established, the serving cellular base station of the wireless device may provide timing configuration information to the wireless device. Such information may, for example, include a timing advance command (TAC), which could include a timing advance (TA) value, and/or a time alignment timer (TAT) value, which may be used by the wireless device to select uplink transmission timing. For example, the wireless device may start (or re-start) the TAT upon receiving updated timing configuration information, upon successfully performing an uplink transmission using a current TA, and/or according to any of various other conditions. As long as the TAT is running, the current TA may be considered valid. If the TAT expires (e.g., because no configured condition for triggering restarting of the TAT has occurred since it was last initiated), the current TA may be considered invalid, and the wireless device may be expected to re-acquire network timing information before being able to perform further uplink data transmissions. In some instances, the wireless device may be able to acquire timing configuration information (e.g., initially, or as a result of previous timing configuration information expiring) while in RRC connected mode by performing a random access procedure, among various possibilities.

In 504, the cellular base station may release the wireless device to inactive mode. For example, the cellular base station may provide a RRCRelease message, which may provide configuration information for suspending the RRC connection and operating in RRC inactive mode.

The indication to release the RRC connection may configure resources for performing uplink transmissions while in the RRC inactive mode. For example, pre-configured resources may be indicated as available to the wireless device to perform a configured grant based small data transfer while in RRC inactive mode. These resources may include time- and frequency resources in which the wireless device can transmit up to a certain volume of data according to a configured grant (CG) based small data transfer (SDT) procedure.

In some instances, the cellular base station may provide timing configuration information to the wireless device for use in RRC inactive mode, for example as part of the RRCRelease message. Such information may include a TA command, e.g., including a TA value, a TAT value, and/or other information. Alternatively, a subset of information normally provided in a TA command, and/or other information, may be provided as part of the timing configuration information. In some instances, it may be the case that timing configuration information explicitly for use in the RRC inactive mode is not provided.

In 506, the wireless device may maintain a timing advance while in RRC inactive mode. This may include storing a timing advance value, monitoring the validity of the timing advance value, and potentially updating the timing advance value, while in RRC inactive mode.

In some aspects, maintaining the timing advance value may include continuing to use a timing advance value configured prior to releasing the RRC connection (e.g., while the RRC connection was established) while in RRC inactive. For example, if the cellular base station does not provide timing configuration information explicitly for use in the RRC inactive mode, or if such timing configuration information does not include an updated TA value, the wireless device may continue using a TA value received while in RRC connected mode. Alternatively, if the cellular base station does provide timing configuration information explicitly for use in the RRC inactive mode, and if such timing configuration information does include an updated TA value, the wireless device may update its TA to the new TA value.

According to various aspects, the wireless device may continue running a TAT that was initiated while the RRC connection was established while in the RRC inactive mode after releasing the RRC connection, or may restart the TAT when releasing the RRC connection. If the TAT is restarted, it may be restarted using the same TAT configuration with which the wireless device was configured while the RRC connection was established (e.g., if the cellular base station does not provide timing configuration information explicitly for use in the RRC inactive mode, or if such timing configuration information does not include an updated TAT configuration), or may be restarted using a (e.g., new or updated) TAT configuration in accordance with timing configuration information provided for use while operating in the RRC inactive mode.

In some aspects, it may be possible that the cellular base station configures the wireless device to consider its TA to be valid indefinitely (e.g., to not expire) in the RRC inactive mode. For example, for certain small cells, and/or for wireless devices that are stationary (e.g., in permanent stationary deployments, or possibly just temporarily stationary conditions), it may be possible that the timing advance for a wireless device is unlikely to change. In such a scenario, the cellular base station may include configuration information indicating that the TA of the wireless device is valid indefinitely/does not expire with the indication to release the RRC connection, at least as one possibility. The configuration information may indicate a value of the indefinitely valid TA (which may be 0, as one possibility, e.g., in a sufficiently small cell), or the wireless device may continue using a previously provided TA.

Additionally, or alternatively, in some instances it may be possible that the wireless device autonomously updates the TA while in RRC inactive mode. Such behavior may be configured in conjunction with an indefinite TA validity configuration, or the wireless device may manage the expiry of the TA with a TAT even when such behavior is configured, according to various aspects. In order to autonomously update the TA while in RRC inactive mode, it may be the case that the wireless device determines the downlink timing for when a TA value is provided to the wireless device by the serving cellular base station (e.g., while the RRC connection is established, or when the RRC connection is released). The wireless device may then also determine downlink timing for one or more downlink transmission received while in the RRC inactive mode, and may adjust the TA based at least in part on the difference in downlink timing between the indication of the TA value and the (e.g., more recent) downlink transmission(s) received while in RRC inactive mode. Such updates may be performed at specified intervals (e.g., periodically), and/or may be triggered by certain events (e.g., aperiodically). For example, as one possibility, when uplink data arrives at the wireless device baseband, the wireless device may determine to perform a configured grant based uplink transmission while remaining in the RRC inactive mode, and the wireless device may obtain downlink timing (and possibly other information) from synchronization signals (e.g., synchronization signal blocks (SSBs)) provided by the cellular base station in preparation to perform the configured grant based uplink transmission.

In 508, the wireless device may perform a configured grant based small data transfer while in RRC inactive mode. The configured grant based small data transfer may be performed based at least in part on uplink data (e.g., possibly an amount of uplink data below a certain volume threshold) being received at a baseband layer of the wireless device, for example data that was generated by an application operating at an application layer of the wireless device and provided from the application layer to the baseband layer.

The configured grant based small data transfer may be performed using the timing advance maintained by the wireless device while in RRC inactive mode. For example, the wireless device may transmit the data in advance of a configured time- and frequency resource configured for the configured grant based small data transfer by an amount of time equal to the timing advance value, e.g., such that the cellular base station may receive the transmission at the configured time- and frequency resource according to the cellular communication system synchronization scheme.

Note that if the TA expires while the wireless device is in RRC inactive mode, it may be the case that the wireless device does not perform a configured grant based small data transfer while in RRC inactive mode, e.g., even when uplink data that would otherwise trigger a configured grant based small data transfer procedure is received at baseband of the wireless device. For example, if a TAT is configured (e.g., if the TA is not considered indefinitely valid) and the TAT reaches expiry, the TA may be considered to be expired. In such a scenario, if uplink data arrives at baseband of the wireless device, the wireless device may perform a random access channel (RACH) based small data transfer while in the RRC inactive mode, or may resume a RRC connection to perform an uplink transmission, to transfer the uplink data, e.g., instead of performing a configured grant based small data transfer, potentially based at least in part on the TA being expired.

In some instances, it may be possible that the TA expires while the wireless device is in RRC inactive mode, during a configured grant based small data transfer procedure, such as after an uplink transmission is performed and before a network response to the uplink transmission is received by the wireless device. In such a scenario, as one possibility, the network may provide a response that indicates that the small data transfer procedure is complete, and may also include timing configuration information, potentially including a TA value and/or a TAT value. In this case, the wireless device may maintain the newly provided TA and may be able to perform subsequent configured grant based small data transfer procedures while in RRC inactive, e.g., provided the TA remains valid and the configured grant based small data transfer configuration otherwise remains valid.

As another possibility, if the TA expires while in RRC inactive after an uplink transmission is performed and before a network response to the uplink transmission is received by the wireless device, the network may provide a response that indicates to perform one or more subsequent uplink transmissions, and may also include timing configuration information, potentially including a TA value and/or a TAT value. In this case, the wireless device may maintain the newly provided TA and may perform the subsequent configured grant based small data transfer procedures while remaining in RRC inactive.

As a still further possibility, if the TA expires while in RRC inactive after an uplink transmission is performed and before a network response to the uplink transmission is received by the wireless device, the network may provide a response that indicates to perform one or more subsequent uplink transmissions, but does not include timing configuration information. In this case, the wireless device may not have a valid TA and so may not perform a subsequent uplink transmission using a configured grant based small data transfer procedure while remaining in RRC inactive. Instead, the wireless device may perform a subsequent uplink transmission while in the RRC inactive mode using a random access procedure, or may determine to not perform a subsequent uplink transmission while in the RRC inactive mode (e.g., based at least in part on the timing advance having expired and the response to the uplink transmission not including timing configuration information).

Thus, the method of FIG. 5 may be used to maintain a timing advance and perform uplink data transmissions using the timing advance while inactive in a cellular communication system. Such techniques may increase the proportion of time spent by a wireless device in such an inactive mode, which may in turn reduce wireless device power consumption, among other possible benefits, at least according to some aspects.

FIGS. 6-20 and Additional Information

FIGS. 6-19 illustrate further aspects that might be used in conjunction with the method of FIG. 5 if desired. It should be noted, however, that the exemplary details illustrated in and described with respect to FIGS. 6-20 are not intended to be limiting to the disclosure as a whole: numerous variations and alternatives to the details provided herein below are possible and should be considered within the scope of the disclosure.

As previously noted herein, it may be possible for a UE to operate in any of multiple possible RRC modes or states in a cellular communication system, potentially including RRC connected, RRC inactive, and/or RRC idle. At least according to some aspects, in the RRC inactive state, a UE may maintain a non access stratum (NAS) connection to the core network (CN) for the control plane. The UE may not keep any dedicated access stratum (AS) resources but may keep some or all RRC configuration information for the UE from the RRC connection from which the UE was released to the RRC inactive state. With respect to the user plane, as one possibility, it may be the case that the UE cannot perform any dedicated data transmission/reception; instead, if the UE has dedicated data transmission, it may be expected that the UE should enter the RRC connected state. For downlink data transmission, this may be accomplished by way of the gNB paging the UE via a RAN paging mechanism to trigger the UE to re-establish a RRC connection. For uplink data transmission, this may be accomplished by the UE triggering a random access channel (RACH) procedure to re-establish a RRC connection.

It may be the case that an inactive UE can move within a RAN notification area (RNA) without notifying the NG-RAN. Such a UE may perform cell selection/re-selection in a similar manner as an idle UE.

In order to perform a state transition from connected to inactive, it may be the case that a UE receives a RRC release message with suspend information, e.g., from a serving gNB. For a state transition from inactive to connected, a RRC resume procedure may be used, e.g., such as further described in 3GPP TS 38.300 v.16.3.0 section 9.2.2.4. For a state transition from inactive to idle, a UE may receive a RRC release message indicting to perform such a transition, or such a transition may be performed in certain abnormal cases (e.g., being unable to find a cell for camping, in some instances).

Figure 6:
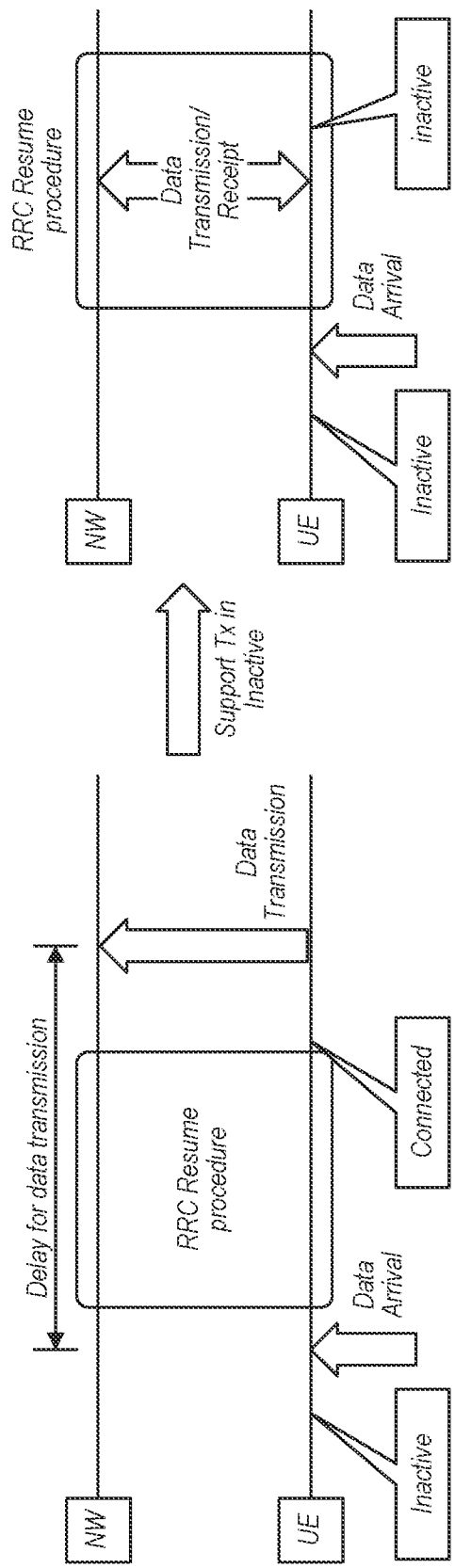
FIG. 6 illustrates exemplary possible differences between scenarios in which an uplink data transmission is performed by resuming connected mode from inactive mode and while remaining in inactive mode, according to some aspects.

In some instances, it may alternatively be possible to support at least some data transmissions in the RRC inactive state without a state transition to the RRC connected state. FIG. 6 illustrates exemplary possible differences between scenarios in which an uplink data transmission is performed by resuming connected mode from inactive mode and while remaining in inactive mode, according to some aspects. As shown, it may be possible for the delay between data arrival at the UE baseband and receipt of the data transmission by the network to be significantly reduced by performing the data transmission while in RRC inactive mode rather than waiting until a RRC resume procedure has been completed and the UE is in RRC connected mode, at least in some instances.

According to some aspects, it may be possible to support performance of uplink small data transmissions using one or more RACH based schemes (e.g., using 2-step and/or 4-step RACH procedures). As another example, it may be possible to support performance of uplink small data transmissions using pre-configured uplink (e.g., physical uplink shared channel (PUSCH)) resources, such as according to a 3GPP configured grant type 1 scheme. At least according to some aspects, performing such a configured grant based uplink data transmission while in the RRC inactive state may require that a UE have a valid timing advance (TA) value, e.g., to ensure that the gNB receives the uplink transmission with the appropriate timing to be able to successfully decode the transmission.

Configuration of configured grant (CG) resources for UE uplink small data transfers while in RRC inactive state may be included in a RRC release message that transitions the UE to the RRC inactive. The configuration may include one type 1 CG configuration, or may possibly include multiple CG configurations. It may be the case that the configuration of CG resource(s) for small data transfers is valid only in the same serving cell. There may be a data volume threshold limiting how much data can be transmitted using such a CG configuration. There may be an association between CG resources and synchronization signal blocks (SSBs) required for CG based small data transfers, at least in some instances. For example, a synchronization signal reference signal received power (RSRP) threshold may be configured for SSB selection, such that a UE can select a SSB with synchronization signal RSRSP above the configured threshold and select the associated CG resource for the uplink data transmission.

It may be the case that a UE can only perform such a CG based small data transfer procedure if the UE has a valid TA. A UE may be able to acquire a TA value via a timing advance command (TAC) in connected mode or via a random access response (RAR) as part of an initial access RACH procedure, according to some aspects. Currently, a UE may only maintain the TA and time alignment timer (TAT) in connected mode.

Accordingly, it may be important to provide mechanisms for maintaining a valid TA while in RRC inactive and/or determining whether a UE has a valid TA while in RRC inactive, in order to support CG based small data procedures in RRC inactive. Accordingly, at least some aspects described herein relate to techniques for maintaining a TA while in RRC inactive mode, and for using such a TA to perform a configured grant based uplink transmission while in RRC inactive mode.

Figure 7:
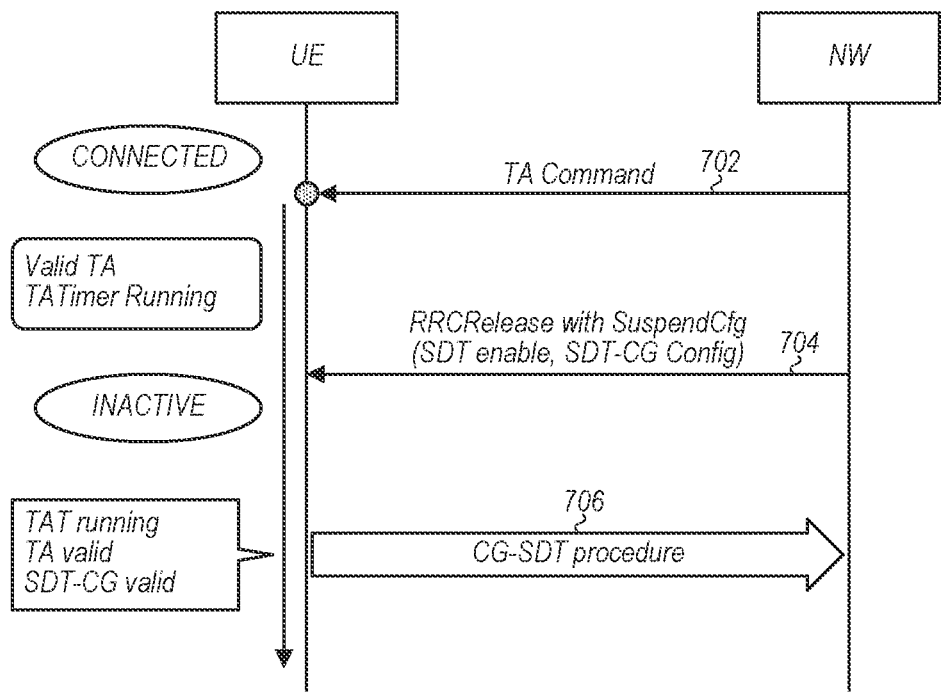
FIGS. 7-8 are signal flow diagrams illustrating aspects of exemplary possible techniques for handling timing alignment in inactive mode by continuing to use a timing advance and time alignment timer configured prior to entering inactive mode, according to some aspects.
Figure 8:
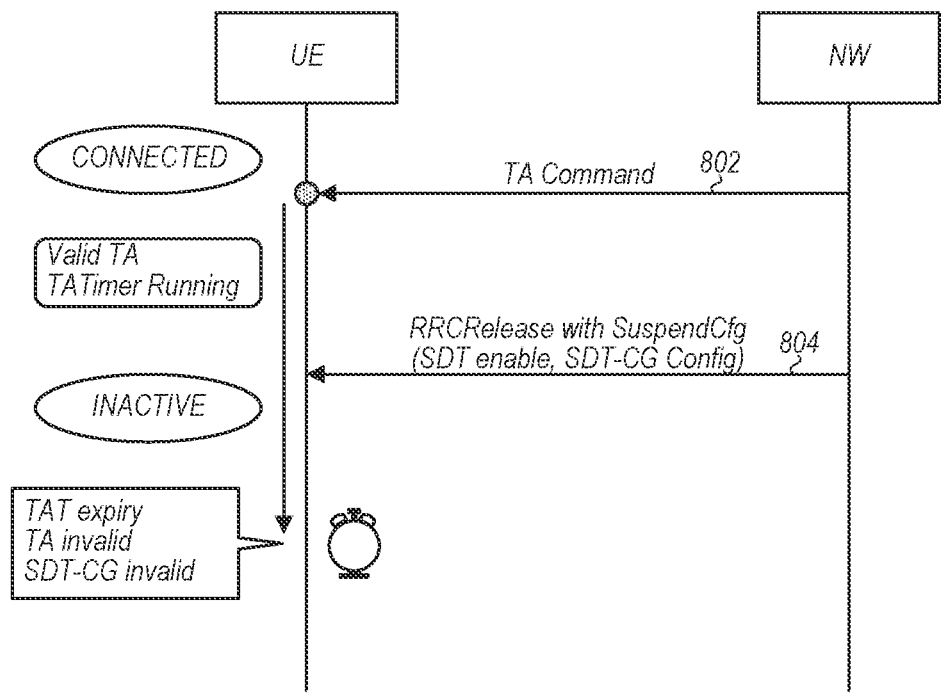

As one possibility, a valid TA may be maintained while in RRC inactive mode by keeping the TA and TAT configured while in RRC connected mode after the RRC connection is released. FIGS. 7-8 are signal flow diagrams illustrating aspects of exemplary such possible techniques for handling timing alignment in inactive mode by continuing to use a timing advance and time alignment timer configured prior to entering inactive mode, according to some aspects.

As shown, in the scenario of FIG. 7, in 702 the network may provide a TA command to a UE while a RRC connection is established. The UE may initiate a TAT in accordance with the TA command, and may keep the TAT running through and after a RRCRelease message with suspend configuration is provided from the NW to the UE in 704. In 706, the UE may receive uplink data at baseband, may determine based at least in part on the TAT being unexpired and the TA being valid that a CG small data transfer can be performed, and may perform the CG small data transfer procedure.

In the scenario of FIG. 8, in 802 the network may provide a TA command to a UE while a RRC connection is established. The UE may initiate a TAT in accordance with the TA command, and may keep the TAT running through and after a RRCRelease message with suspend configuration is provided from the NW to the UE in 804. When the TAT expires, the TA may be considered invalid, such that a CG small data transfer may also be considered invalid.

Figure 9:
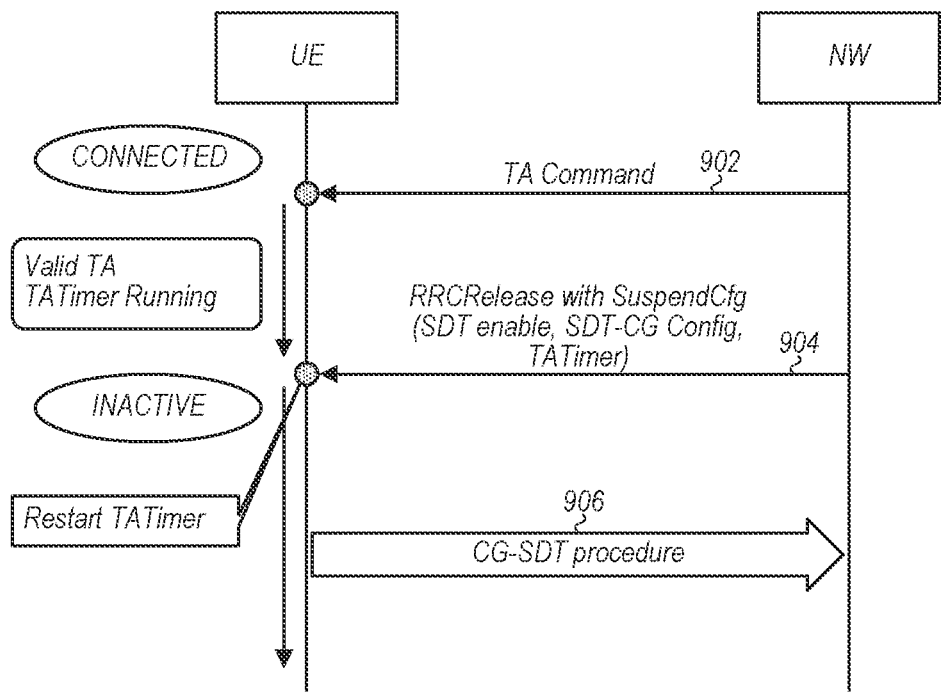
FIGS. 9-10 are signal flow diagrams illustrating aspects of exemplary possible techniques for handling timing alignment in inactive mode including receiving time alignment timer configuration information when being released to inactive mode, according to some aspects.
Figure 10:
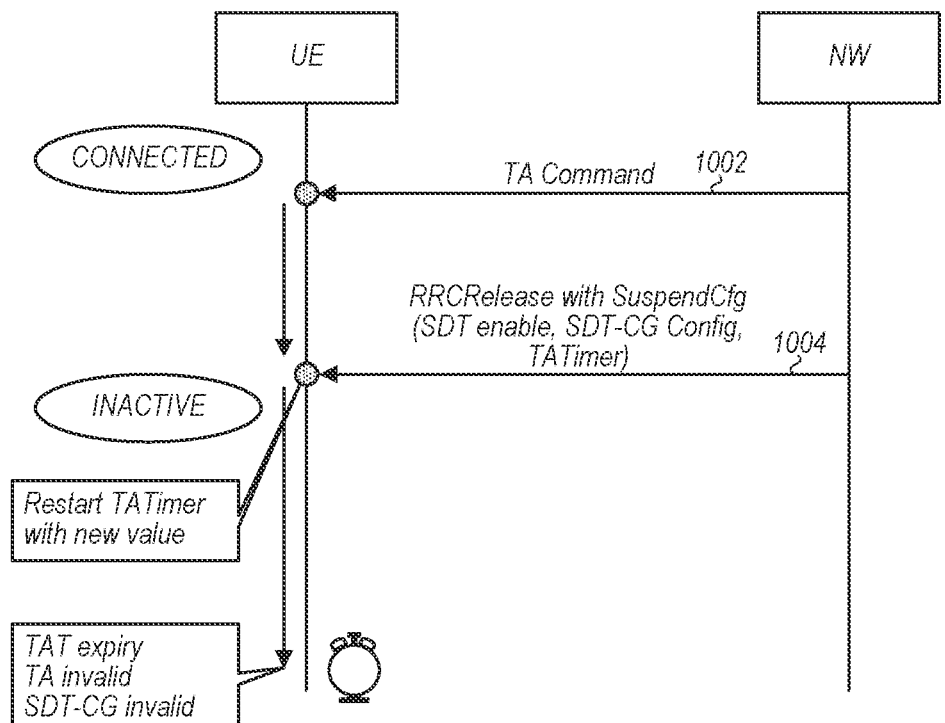

As another possibility, a valid TA may be maintained while in RRC inactive mode by keeping the TA configured while in RRC connected mode but restarting the TAT after or upon the RRC connection being released. FIGS. 9-10 are signal flow diagrams illustrating aspects of exemplary such possible techniques for handling timing alignment in inactive mode including receiving time alignment timer configuration information when being released to inactive mode, according to some aspects.

As shown, in the scenario of FIG. 9, in 902 the network may provide a TA command to a UE while a RRC connection is established. The UE may initiate a TAT in accordance with the TA command. In 904, the UE may receive a RRCRelease message with suspend configuration from the NW, which may include configuration information for CG small data transfers, and may also include TAT configuration information. The TAT may be restarted using the TAT configuration information received with the RRCRelease message (e.g., which may indicate the same TAT length as previously configured or a new TAT length). In 906, the UE may receive uplink data at baseband, may determine based at least in part on the TAT being unexpired and the TA being valid that a CG small data transfer can be performed, and may perform the CG small data transfer procedure.

In the scenario of FIG. 10, in 1002 the network may provide a TA command to a UE while a RRC connection is established. The UE may initiate a TAT in accordance with the TA command. In 1004, the UE may receive a RRCRelease message with suspend configuration from the NW, which may include configuration information for CG small data transfers, and may also include TAT configuration information. The TAT may be restarted using the TAT configuration information received with the RRCRelease message (e.g., which may indicate the same TAT length as previously configured or a new TAT length). When the TAT expires, the TA may be considered invalid, such that a CG small data transfer may also be considered invalid.

Figure 11:
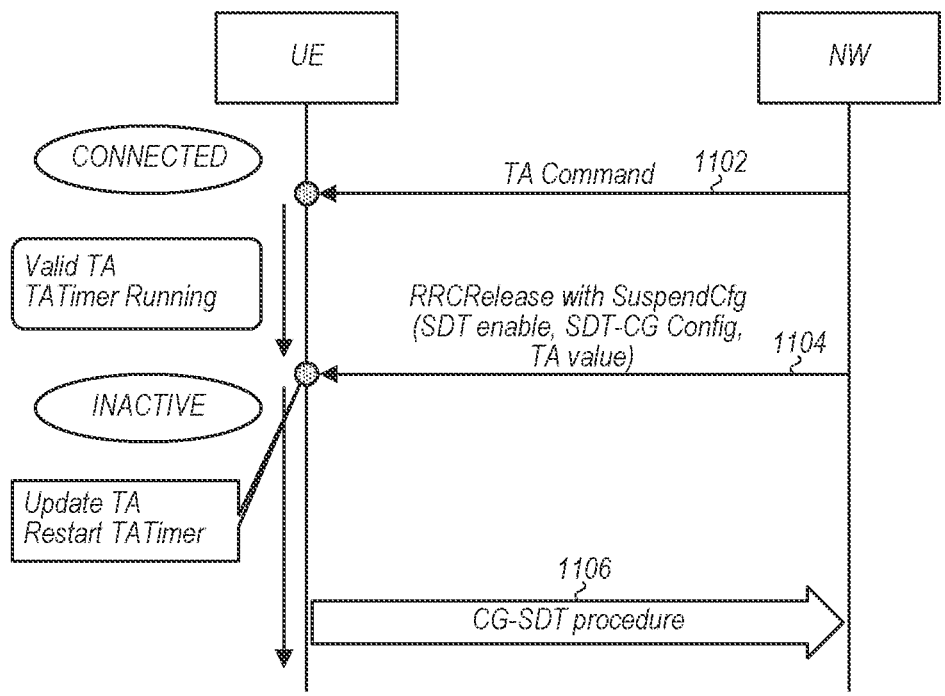
FIGS. 11-12 are signal flow diagrams illustrating aspects of exemplary possible techniques for handling timing alignment in inactive mode including receiving timing advance configuration information when being released to inactive mode, according to some aspects.
Figure 12:
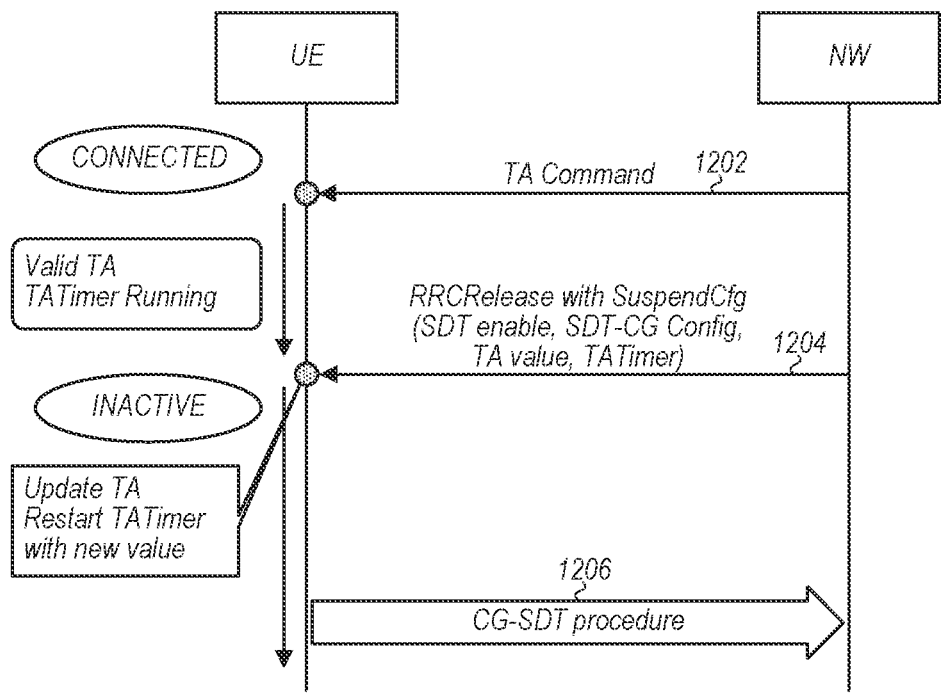

As still further possibility, a new TA value may be provided when the RRC connection is released. FIGS. 11-12 are signal flow diagrams illustrating aspects of exemplary such possible techniques for handling timing alignment in inactive mode including receiving timing advance configuration information when being released to inactive mode, according to some aspects.

As shown, in the scenario of FIG. 11, in 1102 the network may provide a TA command to a UE while a RRC connection is established. The UE may initiate a TAT in accordance with the TA command. In 1104, the UE may receive a RRCRelease message with suspend configuration from the NW, which may include configuration information for CG small data transfers, and may also include a TA value. The TA may be updated and the TAT may be restarted (e.g., using the same TAT length as previously configured). In 1106, the UE may receive uplink data at baseband, may determine based at least in part on the TAT being unexpired and the TA being valid that a CG small data transfer can be performed, and may perform the CG small data transfer procedure.

In the scenario of FIG. 12, in 1202 the network may provide a TA command to a UE while a RRC connection is established. The UE may initiate a TAT in accordance with the TA command. In 1104, the UE may receive a RRCRelease message with suspend configuration from the NW, which may include configuration information for CG small data transfers, and may also include a TA value and TAT configuration information. The TA may be updated and the TAT may be restarted using the TAT configuration information received with the RRCRelease message (e.g., which may indicate the same TAT length as previously configured or a new TAT length). In 1206, the UE may receive uplink data at baseband, may determine based at least in part on the TAT being unexpired and the TA being valid that a CG small data transfer can be performed, and may perform the CG small data transfer procedure.

Figure 13:
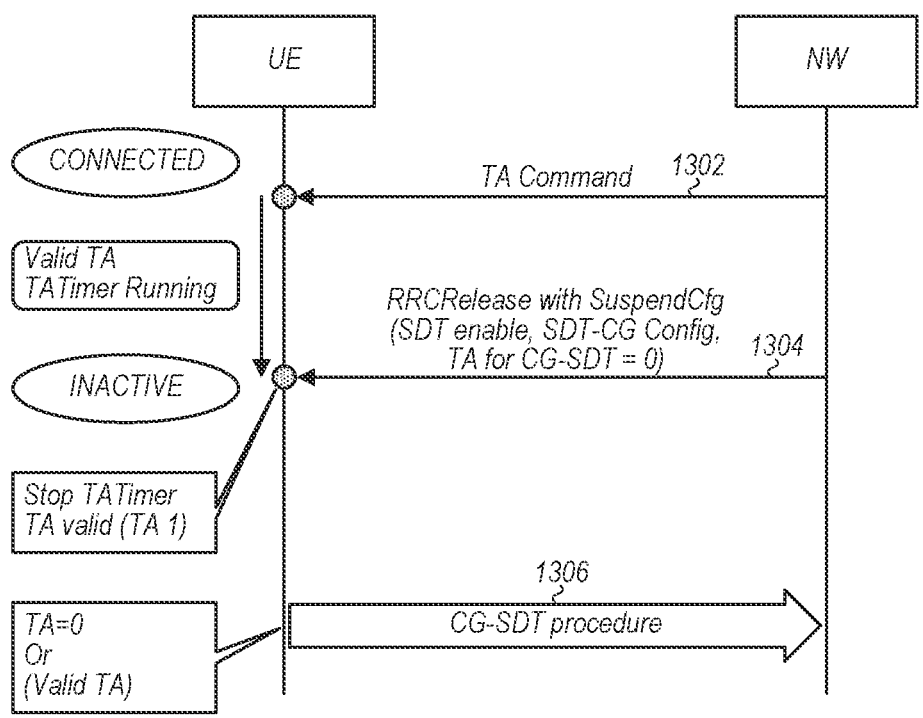
FIG. 13 is a signal flow diagram illustrating aspects of an exemplary possible technique for handling timing alignment in inactive mode in which a timing advance can be considered valid without a time alignment timer running, according to some aspects.

In some instances, it may be possible that the network can configure a UE to always keep a small data transfer CG configuration, for example for a small cell or for a stationary UE, for which a static timing advance (and possibly a timing advance of 0) may be used indefinitely. FIG. 13 is a signal flow diagram illustrating aspects of an exemplary such possible technique for handling timing alignment in inactive mode in which a timing advance can be considered valid without a time alignment timer running, according to some aspects.

As shown, in the scenario of FIG. 13, in 1302 the network may provide a TA command to a UE while a RRC connection is established. The UE may initiate a TAT in accordance with the TA command. In 1304, the UE may receive a RRCRelease message with suspend configuration from the NW, which may include configuration information for CG small data transfers, and may also include an indication that the TA value for CG based small data transfers is 0, or alternatively, may indicate that a current TA (which may also be indicated, or may be carried over from the previous TA command) is valid indefinitely for CG based small data transfers. In this scenario, the UE may stop the TAT, but may maintain the configured TA as valid. In 1306, the UE may receive uplink data at baseband, may determine based at least in part on the indication that the TA is valid indefinitely that a CG small data transfer can be performed, and may perform the CG small data transfer procedure (e.g., using TA=0, if configured, or using an otherwise configured valid TA value).

Figure 14:
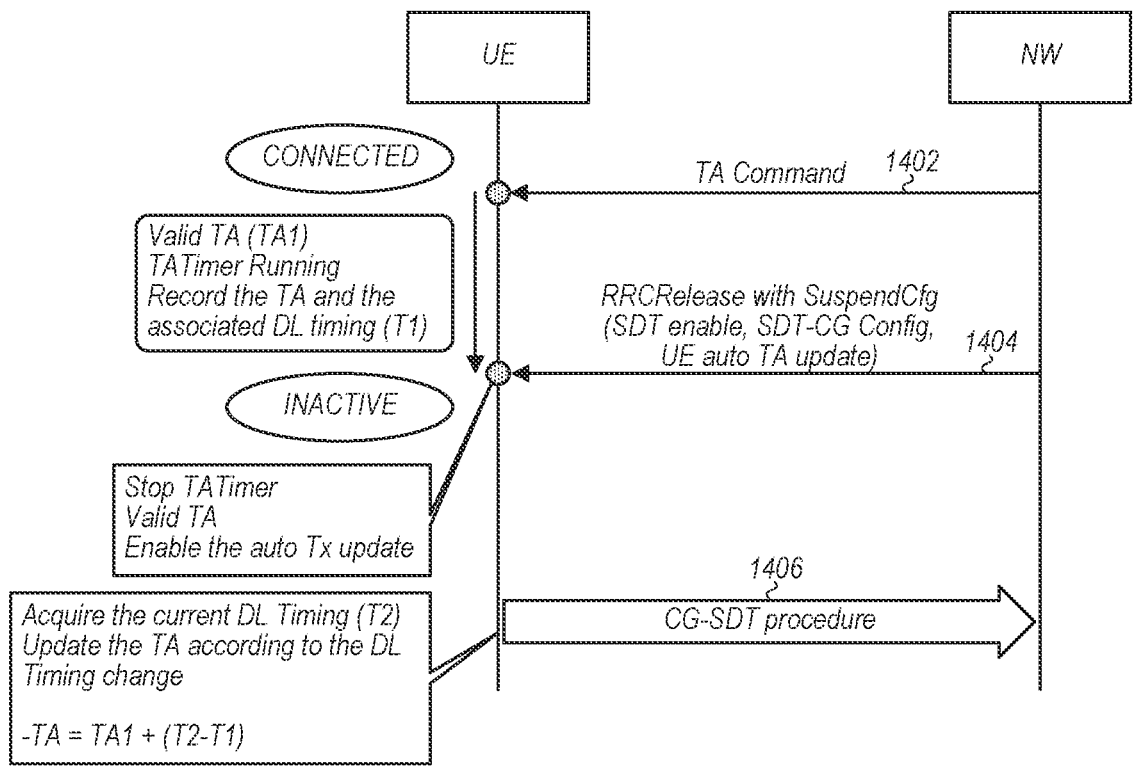
FIGS. 14-15 are signal flow diagrams illustrating aspects of exemplary possible techniques for handling timing alignment in inactive mode in which a wireless device autonomously updates a timing advance while in inactive mode, according to some aspects.
Figure 15:
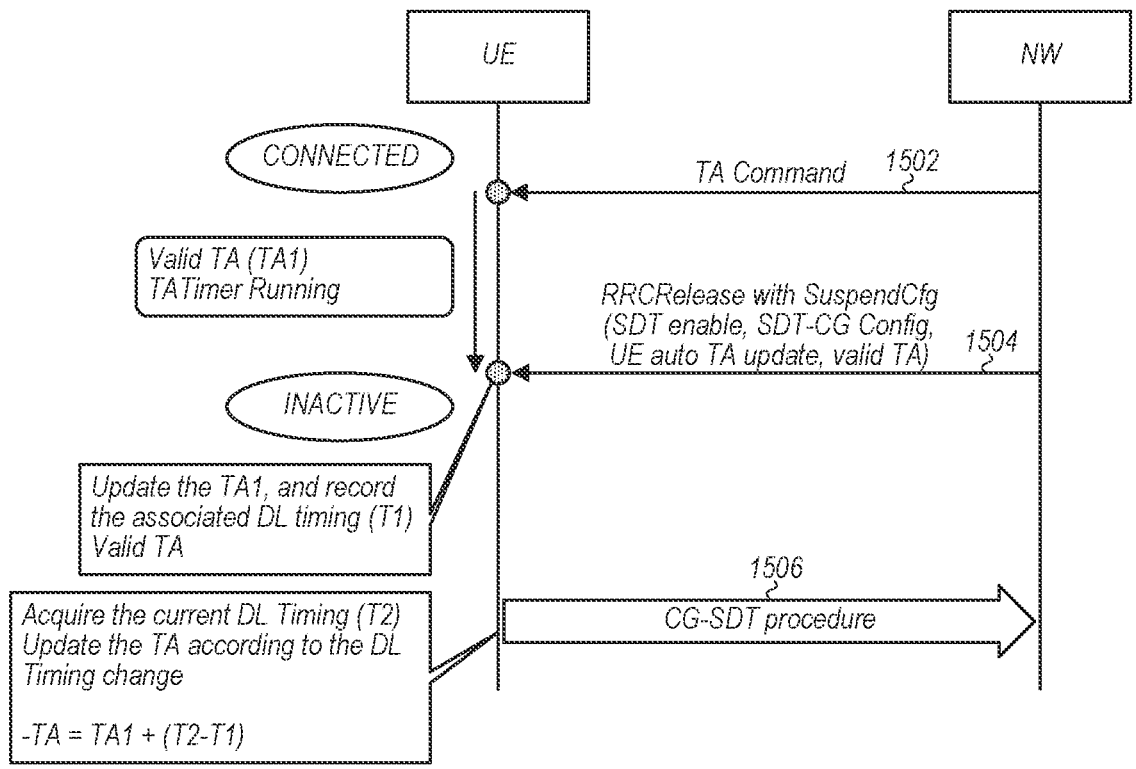

In some aspects, it may be possible for a UE to autonomously adjust its TA while in RRC inactive mode. FIGS. 14-15 are signal flow diagrams illustrating aspects of exemplary such possible techniques for handling timing alignment in inactive mode in which a wireless device autonomously updates a timing advance while in inactive mode, according to some aspects.

As shown, in the scenario of FIG. 14, in 1402 the network may provide a TA command to a UE while a RRC connection is established. The UE may initiate a TAT in accordance with the TA command. The UE may record the TA and the associated downlink timing (T1). In 1404, the UE may receive a RRCRelease message with suspend configuration from the NW, which may include configuration information for CG small data transfers, and may also include an indication for the UE to autonomously update the TA value while in RRC inactive mode. According to various aspects, it may be the case that the TA can be considered valid indefinitely when such an arrangement is configured, or a TAT may be configured and started. If the TA can be considered valid indefinitely, the UE may stop the TAT, while maintaining the configured TA as valid. In 1406, the UE may receive uplink data at baseband. The UE may acquire the current downlink timing (T2) (e.g., using sychronization signals provided by the network) and may update the TA according to the downlink timing change (e.g., between T1 and T2). The UE may perform a CG small data transfer using the autonomously updated TA value.

In the scenario of FIG. 15, in 1502 the network may provide a TA command to a UE while a RRC connection is established. The UE may initiate a TAT in accordance with the TA command. The UE may record the TA. In 1504, the UE may receive a RRCRelease message with suspend configuration from the NW, which may include configuration information for CG small data transfers, and may also include an updated TA value and an indication for the UE to autonomously update the TA value while in RRC inactive mode. The UE may update the TA and record the associated downlink timing (T1). According to various aspects, it may be the case that the TA can be considered valid indefinitely when such an arrangement is configured, or a TAT may be configured and started. If the TA can be considered valid indefinitely, the UE may stop the TAT, while maintaining the configured TA as valid. In 1506, the UE may receive uplink data at baseband. The UE may acquire the current downlink timing (T2) (e.g., using sychronization signals provided by the network) and may update the TA according to the downlink timing change (e.g., between T1 and T2). The UE may perform a CG small data transfer using the autonomously updated TA value.

Figure 16:
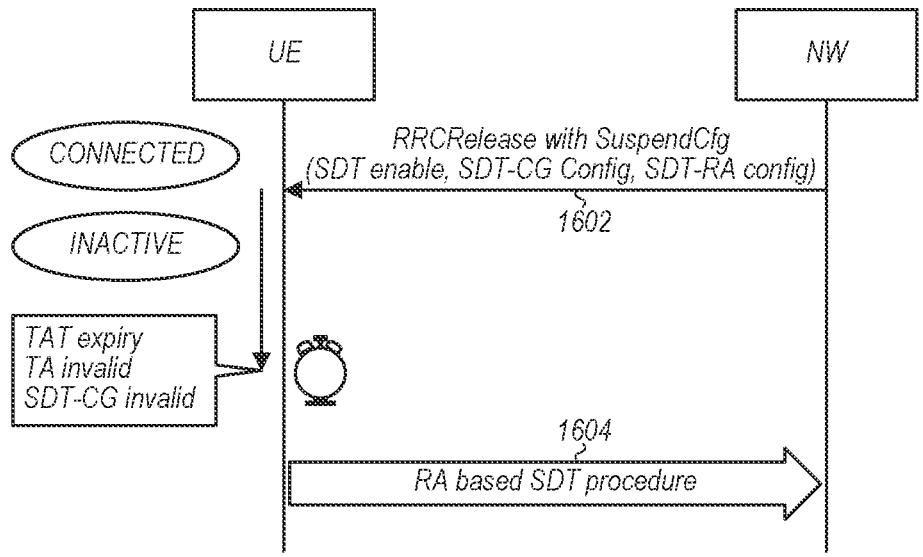
FIGS. 16-17 are signal flow diagrams illustrating aspects of exemplary possible scenarios in which no valid timing advance is available to a wireless device while in inactive mode, according to some aspects.
Figure 17:
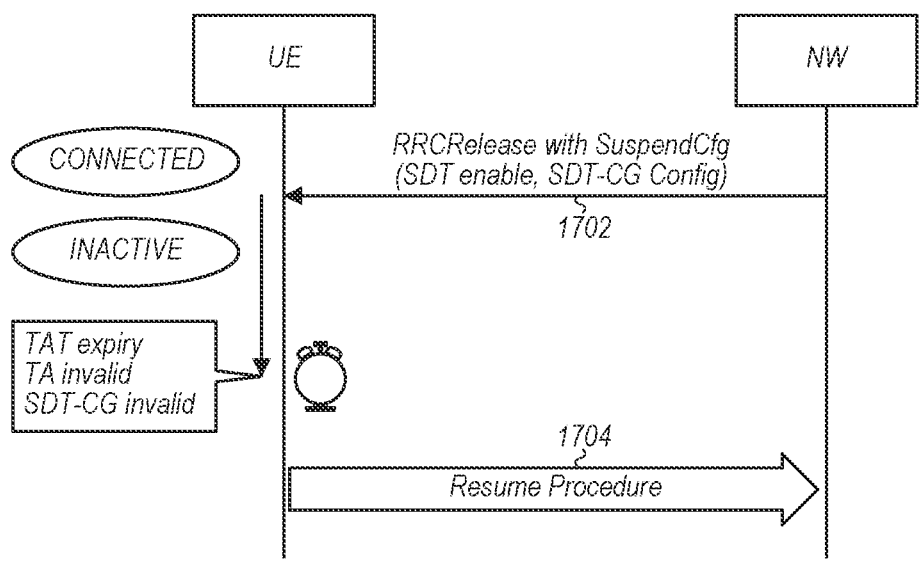

In scenarios in which a UE has no valid TA, it may be the case that a UE can regard the small data transfer CG configuration as invalid and discard or delete it. In such a scenario, if a small data transfer procedure is triggered (e.g., if an amount of uplink data below a certain threshold arrives at baseband while in RRC inactive mode), it may be possible for the UE to instead trigger a RACH based small data transfer, if such a procedure is configured, or to resume a RRC connection to perform the uplink data transmission. FIGS. 16-17 are signal flow diagrams illustrating aspects of exemplary such possible scenarios in which no valid timing advance is available to a wireless device while in inactive mode, according to some aspects.

In the scenario of FIG. 16, in 1602, a UE may receive a RRCRelease message with suspend configuration from a NW, which may include configuration information for CG small data transfers, and may also include configuration information for RA small data transfers. In 1604, the UE may receive uplink data at baseband. When the uplink data is received at baseband, the TAT may be expired, and the TA invalid, such that the CG small data transfer configuration may be considered invalid. Accordingly, the UE may instead perform a random access based small data transfer procedure to transmit the uplink data.

In the scenario of FIG. 17, in 1702, a UE may receive a RRCRelease message with suspend configuration from a NW, which may include configuration information for CG small data transfers. In 1604, the UE may receive uplink data at baseband. When the uplink data is received at baseband, the TAT may be expired, and the TA invalid, such that the CG small data transfer configuration may be considered invalid. Accordingly, as RA small data transfers are not configured, the UE may instead perform a RRC resume procedure and may transmit the uplink data once the UE has resumed the RRC connection with the NW.

Figure 18:
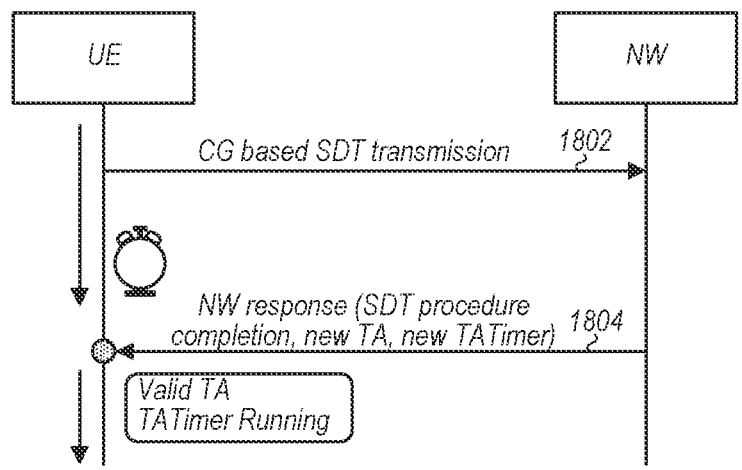
FIGS. 18-20 are signal flow diagrams illustrating aspects of exemplary possible techniques for handling timing alignment in inactive mode including when a time alignment timer expires during a configured grant based small data transmission procedure, according to some aspects.
Figure 19:
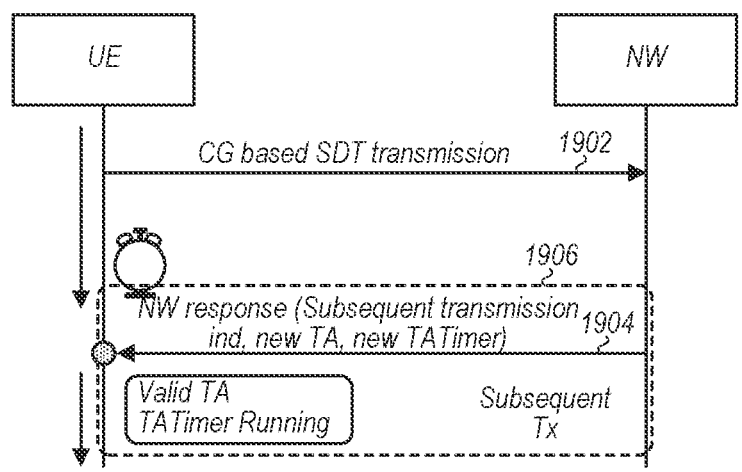
Figure 20:
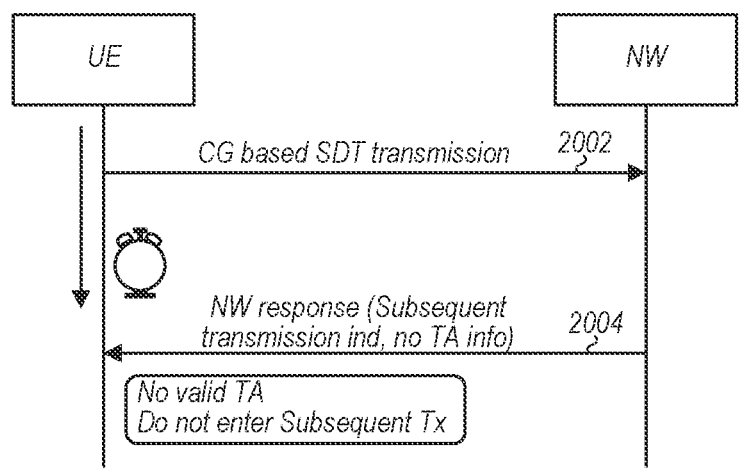

It may also be possible for the TAT for a UE to expire during a CG based small data transfer procedure, such as in the period between CG small data transfer transmission and feedback reception from the NW. FIGS. 18-20 are signal flow diagrams illustrating aspects of exemplary possible techniques for handling timing alignment in inactive mode including in such scenarios when a time alignment timer expires during a configured grant based small data transmission procedure, according to some aspects.

In the scenario of FIG. 18, in 1802, a UE may perform a CG based small data transfer transmission to a NW. Prior to receiving any response from the NW, the TAT of the UE may expire. In 1804, the UE may receive a response from the network, indicating completion of the small data transfer procedure, and including a new TA and TAT value. The UE may update the TA using the indicated TA value, and may restart the TAT using the indicated TAT value. This may allow the UE to perform further CG based small data transfers while in RRC inactive mode, if such a procedure is triggered, at least until expiry of the TAT.

In the scenario of FIG. 19, in 1902, a UE may perform a CG based small data transfer transmission to a NW. Prior to receiving any response from the NW, the TAT of the UE may expire. In 1904, the UE may receive a response from the network, including a subsequent transmission indication, and including a new TA and TAT value. The UE may update the TA using the indicated TA value, restart the TAT using the indicated TAT value, and perform the subsequent transmission(s) using the valid TA.

In the scenario of FIG. 20, in 2002, a UE may perform a CG based small data transfer transmission to a NW. Prior to receiving any response from the NW, the TAT of the UE may expire. In 2004, the UE may receive a response from the network, including a subsequent transmission indication, but not including a new TA or TAT value. As the UE may not have a valid TA, the UE may not perform the subsequent transmission(s), and may regard the small data transfer procedure as complete. Alternatively, the UE may trigger a random access based small data transfer during the subsequent phase if there is further uplink data to transmit while in the RRC inactive mode, or may perform a RRC resume procedure and resume a RRC connection to perform any subsequent uplink data transmissions, based at least in part on the lack of a valid TA.

In the following further exemplary aspects are provided.

One set of aspects may include a baseband processor configured to perform operations comprising: establishing a radio resource control (RRC) connection with a cellular base station; receiving an indication to release the RRC connection and to operate in RRC inactive mode, wherein the indication to release the RRC connection configures resources for performing uplink transmissions while in the RRC inactive mode; maintaining a timing advance while in the RRC inactive mode; and performing an uplink transmission using resources configured for performing uplink transmissions while in the RRC inactive mode, wherein the uplink transmission is performed using the timing advance.

According to some aspects, the baseband processor is further configured to perform operations comprising: initiating a time alignment timer (TAT) while the RRC connection is established; and continuing the TAT while in the RRC inactive mode after releasing the RRC connection.

According to some aspects, the baseband processor is further configured to perform operations comprising: initiating a time alignment timer (TAT) while the RRC connection is established; and restarting the TAT when releasing the RRC connection.

According to some aspects, the indication to release the RRC connection and to operate in RRC inactive mode further includes timing configuration information for use while operating in the RRC inactive mode.

According to some aspects, the timing configuration information includes a time alignment timer (TAT) value, wherein the baseband processor is further configured to perform operations comprising: initiating a TAT when releasing the RRC connection using the TAT value provided in the timing configuration information.

According to some aspects, the timing configuration information includes a timing advance value, wherein maintaining the timing advance while in the RRC inactive mode includes updating the timing advance to the timing advance value provided in the timing configuration information.

According to some aspects, wherein the indication to release the RRC connection and to operate in RRC inactive mode further includes configuration information indicating that the timing advance does not expire.

According to some aspects, the indication to release the RRC connection and to operate in RRC inactive mode further includes configuration information indicating to use a timing advance value of 0.

According to some aspects, the baseband processor is further configured to perform operations comprising: determining downlink timing of the indication to release the RRC connection and to operate in RRC inactive mode; determining downlink timing for one or more downlink transmissions received while in the RRC inactive mode; and adjusting the timing advance based at least in part on a difference in downlink timing between the indication to release the RRC connection and to operate in RRC inactive mode and the one or more downlink transmissions received while in the RRC inactive mode.

Another set of aspects may include a wireless device, comprising: an antenna; a radio operably coupled to the antenna; and a processor operably coupled to the radio; wherein the wireless device is configured to: establish a wireless link with a cellular base station; maintain a timing advance while operating in radio resource control (RRC) inactive mode; and perform an uplink transmission using pre-configured uplink resources while in the RRC inactive mode using the timing advance.

According to some aspects, the wireless device is further configured to: maintain a time alignment timer (TAT) while in the RRC inactive mode, determine whether the timing advance is expired based at least in part on the TAT, wherein if the TAT is expired, the timing advance is determined to be expired, wherein performing the uplink transmission using the pre-configured uplink resources while in the RRC inactive mode using the timing advance is based at least in part on whether the timing advance is expired.

According to some aspects, the wireless device is further configured to: determine, while in the RRC inactive mode, that the timing advance is expired; and determine, while in the RRC inactive mode, to use a random access procedure or resume a RRC connection to perform an uplink transmission based at least in part on the timing advance being expired.

According to some aspects, the wireless device is further configured to: determine that the timing advance is expired after the uplink transmission is performed; receive a response to the uplink transmission, wherein the response to the uplink transmission includes timing configuration information, wherein the timing configuration information includes at least a timing advance value.

According to some aspects, the wireless device is further configured to: determine that the timing advance is expired after the uplink transmission is performed; receive a response to the uplink transmission, wherein the response to the uplink transmission includes a subsequent transmission indication, wherein the response to the uplink transmission does not include timing configuration information; and perform a subsequent uplink transmission while in the RRC inactive mode using a random access procedure based at least in part on the timing advance having expired and the response to the uplink transmission not including timing configuration information.

According to some aspects, the wireless device is further configured to: determine that the timing advance is expired after the uplink transmission is performed; receive a response to the uplink transmission, wherein the response to the uplink transmission includes a subsequent transmission indication, wherein the response to the uplink transmission does not include timing configuration information; and determine to not perform a subsequent uplink transmission while in the RRC inactive mode based at least in part on the timing advance having expired and the response to the uplink transmission not including timing configuration information.

Yet another set of aspects may include a method, comprising: by a wireless device: establishing a radio resource control (RRC) connection with a cellular base station; receiving an indication to release the RRC connection, wherein the indication to release the RRC connection configures resources for performing uplink transmissions while in a RRC inactive mode; maintaining a timing advance while in the RRC inactive mode; and performing an uplink transmission using resources configured for performing uplink transmissions while in the RRC inactive mode, wherein the uplink transmission is performed using the timing advance.

According to some aspects, the method further comprises: maintaining a time alignment timer (TAT) while in the RRC inactive mode, wherein the TAT is one of: initiated during the RRC connection and continued while in the RRC inactive mode after releasing the RRC connection; started when releasing the RRC connection using TAT configuration information received before the indication to release the RRC connection; or started when releasing the RRC connection using TAT configuration information included with the indication to release the RRC connection.

According to some aspects, the indication to release the RRC connection further includes configuration information indicating that the timing advance is valid indefinitely.

According to some aspects, the method further comprises: adjusting the timing advance based at least in part on differences in downlink timing between downlink transmissions received while in the RRC inactive mode.

According to some aspects, the method further comprises: determining that the timing advance is expired while in the RRC inactive mode; and performing a random access procedure or resuming a RRC connection to perform an uplink transmission based at least in part on the timing advance being expired while in the RRC inactive mode.

Still another set of aspects may include a method, comprising: by a cellular base station: establishing a radio resource control (RRC) connection with a wireless device; providing timing configuration information to the wireless device, wherein the timing configuration information includes at least a timing advance value; providing an indication to the wireless device to release the RRC connection and to operate in RRC inactive mode, wherein the indication to release the RRC connection configures resources for performing uplink transmissions while in the RRC inactive mode; and receiving an uplink transmission from the wireless device using resources configured for performing uplink transmissions while in the RRC inactive mode, wherein the uplink transmission is performed using the timing advance.

According to some aspects, the indication to release the RRC connection and to operate in RRC inactive mode further includes timing configuration information for use by the wireless device while operating in the RRC inactive mode, wherein the timing configuration information includes one or more of: a time alignment timer (TAT) value; or a timing advance value.

According to some aspects, the indication to release the RRC connection and to operate in RRC inactive mode further includes configuration information indicating that the timing advance does not expire.

According to some aspects, the indication to release the RRC connection and to operate in RRC inactive mode further includes configuration information indicating for the wireless device to autonomously adjust the timing advance while in the RRC inactive mode.

A further exemplary aspect may include a method, comprising: performing, by a device, any or all parts of the preceding examples.

Another exemplary aspect may include a device, comprising: an antenna; a radio coupled to the antenna; and a processing element operably coupled to the radio, wherein the device is configured to implement any or all parts of the preceding examples.

A further exemplary set of aspects may include a non-transitory computer accessible memory medium comprising program instructions which, when executed at a device, cause the device to implement any or all parts of any of the preceding examples.

A still further exemplary set of aspects may include a computer program comprising instructions for performing any or all parts of any of the preceding examples.

Yet another exemplary set of aspects may include an apparatus comprising means for performing any or all of the elements of any of the preceding examples.

Still another exemplary set of aspects may include an apparatus comprising a processing element configured to cause a device to perform any or all of the elements of any of the preceding examples.

Another exemplary set of aspects may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Aspects of the present disclosure may be realized in any of various forms. For example, in some aspects, the present subject matter may be realized as a computer-implemented method, a computer-readable memory medium, or a computer system. In other aspects, the present subject matter may be realized using one or more custom-designed hardware devices such as ASICs. In other aspects, the present subject matter may be realized using one or more programmable hardware elements such as FPGAs.

In some aspects, a non-transitory computer-readable memory medium (e.g., a non-transitory memory element) may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to perform operations comprising:
   receiving an indication to release a radio resource control (RRC) connection and to operate in RRC inactive mode, wherein the indication to release the RRC connection configures resources for performing uplink transmissions while in the RRC inactive mode and includes timing configuration information, the timing configuration information comprising a time alignment timer (TAT) value, for use while operating in the RRC inactive mode;
   initiating a TAT when releasing the RRC connection using the TAT value provided in the timing configuration information;
   maintaining a timing advance while in the RRC inactive mode; and
   interfacing with radio frequency (RF) circuitry to perform an uplink transmission using resources configured for performing uplink transmissions while in the RRC inactive mode, wherein the uplink transmission is performed using the timing advance.

2. The baseband processor of claim 1, wherein
   the TAT is continued while in the RRC inactive mode after releasing the RRC connection.

3. The baseband processor of claim 1, wherein the baseband processor is further configured to perform operations comprising:
   determining downlink timing of the indication to release the RRC connection and to operate in RRC inactive mode;
   determining downlink timing for one or more downlink transmissions received while in the RRC inactive mode; and
   adjusting the timing advance based at least in part on a difference in downlink timing between the indication to release the RRC connection and to operate in RRC inactive mode and the one or more downlink transmissions received while in the RRC inactive mode.

4. A method, comprising:
   receiving an indication to release a radio resource control (RRC) connection and to operate in RRC inactive mode, wherein the indication to release the RRC connection configures resources for performing uplink transmissions while in the RRC inactive mode and includes timing configuration information, the timing configuration information comprising a time alignment timer (TAT) value, for use while operating in the RRC inactive mode;
   initiating a TAT when releasing the RRC connection using the TAT value provided in the timing configuration information;
   maintaining a timing advance while in the RRC inactive mode; and
   performing an uplink transmission using resources configured for performing uplink transmissions while in the RRC inactive mode, wherein the uplink transmission is performed using the timing advance.

5. The method of claim 4, wherein the TAT is continued while in the RRC inactive mode after releasing the RRC connection.

6. The method of claim 4, further comprising:
   determining downlink timing of the indication to release the RRC connection and to operate in RRC inactive mode;
   determining downlink timing for one or more downlink transmissions received while in the RRC inactive mode; and
   adjusting the timing advance based at least in part on a difference in downlink timing between the indication to release the RRC connection and to operate in RRC inactive mode and the one or more downlink transmissions received while in the RRC inactive mode.

7. A method, comprising:
   transmitting, to a user equipment (UE), an indication to release a radio resource control (RRC) connection and to operate in RRC inactive mode, wherein the indication to release the RRC connection configures resources for performing uplink transmissions while in the RRC inactive mode and includes timing configuration information, the timing configuration information comprising a time alignment timer (TAT) value, for use while operating in the RRC inactive mode, wherein the indication to release the RRC connection is useable for:
      initiating a TAT when releasing the RRC connection using the TAT value provided in the timing configuration information; and
      maintaining a timing advance while in the RRC inactive mode; and
   receiving, from the UE, an uplink transmission using resources configured for performing uplink transmissions while in the RRC inactive mode, wherein the uplink transmission is performed using the timing advance.

8. The method of claim 7, wherein the TAT is continued while in the RRC inactive mode after releasing the RRC connection.

9. The method of claim 7, wherein
   the timing advance is adjusted based at least in part on a difference in downlink timing between the indication to release the RRC connection and to operate in RRC inactive mode and one or more downlink transmissions performed while the UE is in the RRC inactive mode.

* * * * *